(12) United States Patent
Holler et al.

(10) Patent No.: US 9,417,050 B2
(45) Date of Patent: Aug. 16, 2016

(54) TRACKING TYPE LASER INTERFEROMETER FOR OBJECTS WITH ROTATIONAL DEGREES OF FREEDOM

(75) Inventors: Mirko Holler, Lauchringen (DE); Jörg Raabe, Villnachern (CH)

(73) Assignee: PAUL SCHERRER INSTITUT, Villigen PSI (CH)

( * ) Notice: Subject to any disclaimer, the term of this patent is extended or adjusted under 35 U.S.C. 154(b) by 57 days.

(21) Appl. No.: 13/993,773

(22) PCT Filed: Nov. 11, 2011

(86) PCT No.: PCT/EP2011/069977
§ 371 (c)(1),
(2), (4) Date: Aug. 20, 2013

(87) PCT Pub. No.: WO2012/079875
PCT Pub. Date: Jun. 21, 2012

(65) Prior Publication Data
US 2013/0329231 A1    Dec. 12, 2013

(30) Foreign Application Priority Data
Dec. 13, 2010   (EP) ..................................... 10194730

(51) Int. Cl.
*G01B 9/02* (2006.01)
*G01B 11/00* (2006.01)
*G01S 17/66* (2006.01)

(52) U.S. Cl.
CPC ........ *G01B 9/02001* (2013.01); *G01B 9/02029* (2013.01); *G01B 11/005* (2013.01); *G01S 17/66* (2013.01); *G01B 2290/70* (2013.01)

(58) Field of Classification Search
CPC .. G01B 11/005; G01B 11/03; G01B 2290/70; G01B 9/2001; G01B 9/02029; G01S 17/42; G01S 17/66; G01S 7/497
USPC .......................... 356/492–493, 496, 498, 508
See application file for complete search history.

(56) References Cited

U.S. PATENT DOCUMENTS

| | | | |
|---|---|---|---|
| 5,917,598 A * | 6/1999 | Mason ....................... | G01L 3/12 356/491 |
| 6,147,748 A | 11/2000 | Hughes | |
| 2002/0036764 A1 | 3/2002 | Osawa et al. | |
| 2003/0090798 A1 | 5/2003 | Evans et al. | |
| 2004/0027576 A1 * | 2/2004 | De Groot et al. ............. | 356/498 |
| 2007/0024861 A1 * | 2/2007 | Yanaka et al. ................ | 356/498 |
| 2008/0316497 A1 * | 12/2008 | Taketomi et al. ............. | 356/498 |

* cited by examiner

Primary Examiner — Michael A Lyons
Assistant Examiner — Dominic J Bologna
(74) Attorney, Agent, or Firm — Laurence Greenberg; Werner Stemer; Ralph Locher

(57) ABSTRACT

A laser interferometer and a method for operating a laser interferometer perform a differential position measurement by laser interferometry of two elements while offering a rotational degree of freedom to one of the elements using a reflecting sphere as a mirror for the laser beam. The laser interferometer and method do not require the object to be aligned with the rotation axis, but instead can track the object in off-centered geometries. This is achieved by employing the pointing of the reflected beam from the sphere as a feedback signal to realign the interferometer which then has a constant beam pointing to the center of the sphere in all cases. The laser interferometer and method keep the direction of the measurement constant. The laser interferometer and method are suitable for homodyne and heterodyne types of laser interferometer technology.

4 Claims, 1 Drawing Sheet

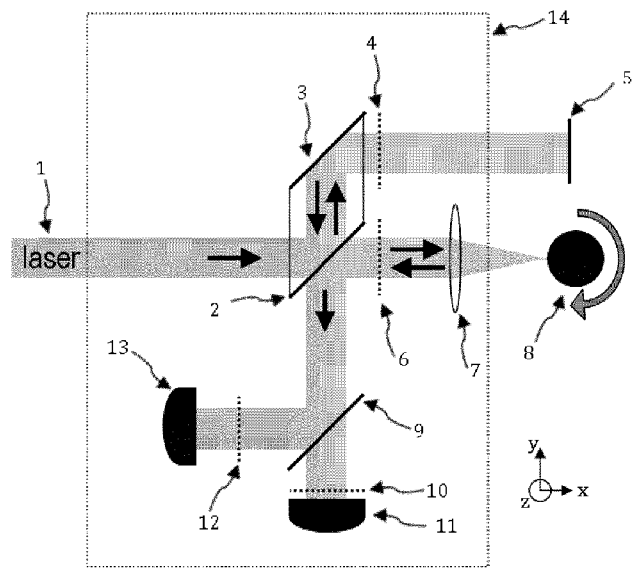
Fig. 1: Schematic of the interferometer setup
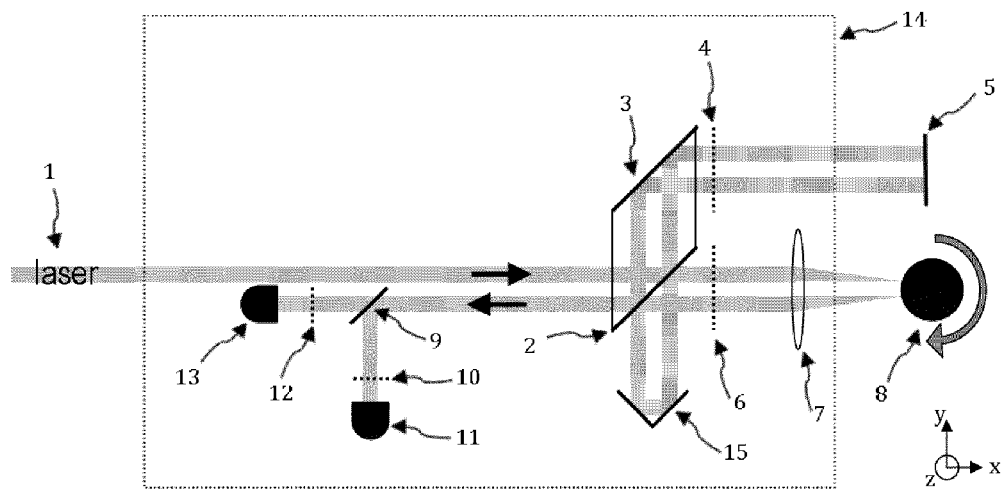
Fig. 2: Modified version of the interferometer setup.

TRACKING TYPE LASER INTERFEROMETER FOR OBJECTS WITH ROTATIONAL DEGREES OF FREEDOM

BACKGROUND OF THE INVENTION

Field of the Invention

The present invention relates to a tracking type laser interferometer for objects with rotational degrees of freedom.

A most commonly known laser interferometer is the Michelson-Interferometer. This interferometer came to high profile by the Michelson-Morley-Experiment. The Michelson-Interferometer uses the phenomenon of the interference which can be only observed when using coherent light. In general terms, the interferometer uses a difference in path lengths or a difference in speed of light in two different media when a light beam is split in two parts. The resulting phase shift is reported as an intensity modulation of the re-unified then interfering light beams.

A limiting requirement of previous schemes for including rotational degrees of freedom in interferometric position measurements was that the spherical surface needed to be centered on the rotation axis. If this was not the case, the reflected beam of the spherical surface did not propagate to the interference detector at all rotation angles and the interference signal was lost during rotation.

BRIEF SUMMARY OF THE INVENTION

It is therefore an object of the present invention to provide a tracking type laser interferometer for objects with rotational degrees of freedom.

This objective is achieved according to the present invention by a laser interferometer, comprising:
  a) a source emitting a coherent light beam, e.g. a laser source (homodyne or heterodyne);
  b) an interferometer optics in order to split the laser beam in two parts with orthogonal polarization to form a laser interferometer module, wherein the two beams propagate as follows:
    i) one beam is reflected by a flat reference surface, passing a quarter-wave retarding wave-plate twice on the way back to the interferometer module, thereby rotating the polarization of the beam by 90 degrees whereby this beam is then transmitted by the beam splitting optics;
    ii) the other beam is imaged to a reflecting sphere or a reflecting cylinder which is the second reference surface of the setup by imaging optics, thereby during propagation passing a quarter-wave retarding wave plate twice and thereby rotating the polarization of the beam by 90 degrees, whereby this beam is then reflected by the interferometer optics yielding in two output beams of the interferometer now having different polarization making the beams distinguishable;
    iii) the two beam are recombined by the interferometer optics such that the combined beams have distinguishable polarization, which optionally requires additional retarding waveplates depending on the concrete realization of the interferometer optical layout;
    iv) for analyzing, the combined output beam is split in two parts by a non-polarizing beam splitter and measured at two detectors as follows:
    v) the combined output beam is sent through a polarizer that is aligned such that both components are transmitted approximately equally wherein the beams interfere;
    vi) the interference pattern is detected by an interference detector whereby this signal corresponds to the differential measurement of elements in the longitudinal direction of the source laser beam where down to sub-nm interferometric resolution is achievable;
    vii) the two beams are also sent through a polarizer that is aligned such that only the beam that was reflected by the spherical surface is transmitted wherein a position measurement of that beam is performed by a 1D position sensitive detector or a 2D position sensitive detector.

Therefore, a movement of the sphere or the cylinder in a direction perpendicular to the propagation direction of the laser beam causes a change in the pointing of the reflected beam which is detected as a change of position on the position sensitive detector. This detector enables the measurement of the position of the spherical surface in the plane perpendicular to the propagation direction of the laser beam with an achievable resolution in the sub-micron range. With other words, this signal measured at the position sensitive detector corresponds to a transversal position measurement of the sphere or cylinder. This signal obtained by the position sensitive detector is therefore representative for feedback tracking of the reflecting cylinder or sphere.

BRIEF DESCRIPTION OF THE SEVERAL VIEWS OF THE DRAWING

Preferred embodiments of the present invention are hereinafter discussed in more detail with reference to the following drawings which depict in:

FIG. 1 a schematic representation of a first laser interferometer setup; and

FIG. 2 a schematic representation of a modified second laser interferometer setup.

DESCRIPTION OF THE INVENTION

FIG. 1 illustrates schematically a first laser interferometer setup. A laser beam 1 is split in two parts by a polarizing beam splitter 2 of a differential laser interferometer module 3. The two beams propagate as follows:

The reflected beam (s-polarized) is reflected by a flat reference surface 5, passing a quarter-wave retarding wave-plate 4 twice on the way back to the interferometer module. Thereby, the polarization of the beam is rotated by 90 degrees. This (p-polarized) beam is then transmitted by the polarizing beam splitter 2.

The transmitted part of the initial laser beam (p-polarized) is imaged to a reflecting sphere 8 which is the second reference surface of the setup by imaging optics 7. During propagation it passes a quarter-wave retarding wave plate 6 twice. Thereby, the polarization of the beam is rotated by 90 degrees. This (s-polarized) beam is then reflected by the polarizing beam splitter 2.

The role of reflected and transmitted beam from the beam splitter 2 is interchangeable, by exchanging the optics in the beam paths.

Because of the polarized beamsplitters, there is no beam sent back to the laser source. The output beams of the interferometer now have different polarization, which makes the beams distinguishable.

For analyzing, the output beams are split in two parts by a non-polarizing beam splitter 9 and measured at two detectors as follows:

The beams are sent through a polarizer 10 that is aligned such that both components are transmitted equally. The beams can then interfere. The interference is detected by an interference detector 11. This signal corresponds to the differential measurement of elements 5 and 8 in x-direction where sub-nm interferometric resolution can be achieved.

The beams are sent through a polarizer 12 that is aligned such that only the beam that was reflected by the spherical surface 8 is transmitted. The position measurement of that beam is performed by a 2D position sensitive detector 13. A movement of the sphere 8 in y- or z-direction causes a change in the pointing of the reflected beam which is detected as a change of position on the position sensitive detector 13. This detector 13 enables the measurement of the position of the spherical surface in the y-/z-plane with an achievable resolution in the sub-micron range.

The method and the apparatus presented here are employing two detectors and overcome the limitation mentioned earlier because the position of the sphere 8 is measured in all dimensions. The signal of the position sensitive detector 13 is then employed as feedback signal for a tracking movement of the entire interferometer optical setup 14 in the y-/z-plane, including the detectors. Thereby, the setup 14 automatically adjusts its pointing to the center of the spherical reference surface 8. Note that due to the differential measurement and the flat reference surface 5 the interference (measurement in x-direction) is insensitive to such translational movements.

A requirement for this scheme is that the laser input beam to the interferometer setup is coupled to the movement of the interferometer, which can be achieved by delivering the light using an optical fiber or using a mirror system.

The interferometer relies on two different polarizations of the two measurement beams. This makes it not only usable with homodyne interferometer schemes, but directly allows using of heterodyne laser interferometer techniques.

Further embodiments of the present invention can be created comprising the following features:

Variant 1:

For 1D tracking, it is possible to use a 1D position sensitive detector (13), when restricting the movement of the interferometer to one direction (in the y-/z-plane) which is already mentioned earlier.

Variant 2:

As reflecting surface offering a rotational degree of freedom, a cylinder can be employed instead of a sphere 8. In this situation a tracking in z-direction does not need to be performed and the tracking can be restricted to the y-direction, combined with Variant 1.

Variant 3:

The range of movement of the sphere 8 in x-direction is restricted to the Rayleigh range of the focused laser beam. It can be increased by a movement of the interferometer in x-direction. Thereby, an auto focusing of the interferometer can be achieved. The focusing situation can be detected by not only measuring the position of the reflected beam from the sphere (8), but also its dimension. This can be realized, for example, by using a pixilated detector at position 13 in the setup.

Variant 4:

The method can be implemented in a two path scheme, doubling the interferometric resolution. For this the beam path is modified as indicated in FIG. 2. A retro-reflector 15 is added to the setup to fold the beam.

Variant 5:

The setup can be realized with a non-differential measurement, where the flat reference surface 5 is installed on the moving part of the interferometer 14. Instead of a flat reference surface at position 5 a retro-reflector can be used in this case. This modification can also be combined with other variants of the setup, presented previously.

The invention claimed is:

1. A laser interferometer, comprising:
   a) a coherent light source emitting a source laser beam;
   b) interferometer optics forming a laser interferometer module configured to split the source laser beam into two beam parts propagating with orthogonal polarization;
   c) a flat first reference surface and a quarter-wave retarding wave-plate, one of the two beam parts being reflected by said first flat reference surface and passing said quarter-wave retarding wave-plate twice while propagating back to said interferometer module, to rotate the polarization of the one beam part by 90 degrees and then transmit the one beam part by said interferometer optics;
   d) imaging optics, a reflecting sphere or reflecting cylinder forming a second reference surface and another quarter-wave retarding wave plate, the other of the two beam parts being imaged to said reflecting sphere or reflecting cylinder by said imaging optics and during propagation passing said other quarter-wave retarding wave plate twice to rotate the polarization of the other beam part by 90 degrees and then reflect the beam by said interferometer optics yielding two output beams of the laser interferometer having different polarization making the beam parts distinguishable;
   e) said interferometer optics recombining the two beam parts into a combined output beam having distinguishable polarization;
   f) a non-polarizing beam splitter splitting the combined output beam into two beam components to be measured for analysis;
   g) a polarizer receiving the combined output beam and being aligned to transmit the two beam components approximately equally with the beam components interfering;
   h) an interference detector detecting an interference pattern and emitting a signal corresponding to a differential measurement of said first and second reference surfaces in a longitudinal direction of the source laser beam configured to achieve down to a sub-nm interferometric resolution;
   i) another polarizer and a 1D position sensitive detector or a 2D position sensitive detector, said other polarizer receiving the two beam components and being aligned to transmit only the other beam part reflected by said spherical surface or reflecting cylinder and perform a position measurement of the reflected other beam part by said 1D position sensitive detector or said 2D position sensitive detector.

2. The laser interferometer according to claim 1, wherein said coherent light source is a homodyne or heterodyne light source.

3. A method for operating a laser interferometer, the method comprising the following steps:
   a) emitting a source laser beam from a coherent light source;
   b) splitting the source laser beam in two beam parts with orthogonal polarization using interferometer optics forming a laser interferometer module, and propagating the two beam parts as follows:
   i) reflecting one of the beam parts using a first flat reference surface and passing a quarter-wave retarding wave-plate twice with the one beam part on its way back to the interferometer module, to rotate the polarization of the one beam part by 90 degrees and then transmit the one beam part using the interferometer optics;

ii) imaging the other of the two beam parts to a reflecting sphere or reflecting cylinder forming a second reference surface using imaging optics, passing another quarter-wave retarding wave plate twice with the other beam part during propagation, rotating the polarization of the other beam part by 90 degrees and then reflecting the other beam part using the interferometer optics yielding two output beams of the interferometer having different polarization making the beam parts distinguishable;

iii) recombining the two beam parts, using the interferometer optics, into a combined beam having distinguishable polarization;

iv) splitting the combined output beam into two beam components, using a non-polarizing beam splitter, for measurement by two detectors for analysis as follows:

v) sending the combined output beam through a polarizer aligned to transmit the two beam components approximately equally with the beam components interfering;

vi) detecting an interference pattern using an interference detector and emitting a signal corresponding to a differential measurement of the first and second reference surfaces in longitudinal direction of the source laser beam to achieve down to a sub-nm interferometric resolution;

vii) additionally sending the two beam components through another polarizer aligned to transmit only the other beam part reflected by the spherical surface or reflecting cylinder and performing a position measurement of the reflected other beam part using a 1D position sensitive detector or a 2D position sensitive detector.

4. The method according to claim 3, wherein the coherent light source is a homodyne or heterodyne light source.

\* \* \* \* \*